United States Patent
Beasley et al.

(10) Patent No.: US 9,086,507 B2
(45) Date of Patent: Jul. 21, 2015

(54) DETERMINING CHARACTERISTICS OF A SUBTERRANEAN BODY USING PRESSURE DATA AND SEISMIC DATA

(75) Inventors: Craig J. Beasley, Houston, TX (US); Iain Bush, East Horsley (GB)

(73) Assignee: WesternGeco L.L.C., Houston, TX (US)

( * ) Notice: Subject to any disclaimer, the term of this patent is extended or adjusted under 35 U.S.C. 154(b) by 870 days.

(21) Appl. No.: 12/193,278

(22) Filed: Aug. 18, 2008

(65) Prior Publication Data

US 2010/0042325 A1    Feb. 18, 2010

(51) Int. Cl.
| | |
|---|---|
| G01V 1/40 | (2006.01) |
| G01V 9/00 | (2006.01) |
| G01V 1/00 | (2006.01) |
| G01V 1/28 | (2006.01) |
| G01V 1/30 | (2006.01) |
| G01V 1/50 | (2006.01) |

(52) U.S. Cl.
CPC .. *G01V 1/50* (2013.01); *G01V 1/30* (2013.01); *G01V 2210/612* (2013.01); *G01V 2210/616* (2013.01)

(58) Field of Classification Search
CPC ..... G01V 1/30; G01V 1/50; G01V 2210/212; G01V 2210/616
USPC ............................................ 702/6–14, 16–18
See application file for complete search history.

(56) References Cited

U.S. PATENT DOCUMENTS

| | | | |
|---|---|---|---|
| 4,280,200 A | 7/1981 | Silverman | |
| 5,010,527 A | 4/1991 | Mahrer | |
| 5,128,866 A * | 7/1992 | Weakley | ......................... 702/11 |
| 5,574,218 A | 11/1996 | Withers | |
| 5,899,272 A | 5/1999 | Loree | |
| 5,924,049 A | 7/1999 | Beasley et al. | |
| 6,112,817 A * | 9/2000 | Voll et al. | ....................... 166/370 |
| 6,206,108 B1 * | 3/2001 | MacDonald et al. | ............ 175/24 |
| 6,263,283 B1 * | 7/2001 | Snider et al. | ....................... 702/6 |
| 6,412,561 B1 | 7/2002 | Brown et al. | |
| 6,473,696 B1 * | 10/2002 | Onyia et al. | ....................... 702/6 |
| 7,003,439 B2 * | 2/2006 | Aldred et al. | .................... 703/10 |
| 7,063,174 B2 | 6/2006 | Chemali et al. | |
| 7,127,353 B2 | 10/2006 | Geiser | |
| 7,134,492 B2 | 11/2006 | Willberg et al. | |

(Continued)

FOREIGN PATENT DOCUMENTS

WO    02073240    9/2002

OTHER PUBLICATIONS

M.A. Biot, Theory of Propagation of Elastic Waves in a Fluid-Saturated Porous Solid. II Higher Frequency Range, The Journal of the Acoustical Society of America, Mar. 1956, pp. 179-191, vol. 28, No. 2.

(Continued)

*Primary Examiner* — Janet Suglo
(74) *Attorney, Agent, or Firm* — Abimbola Bukoye; Gary Gex

(57) ABSTRACT

To determine characteristics of a subterranean body, pressure testing is performed, where the pressure testing involves drawing down pressure in the well. Pressure data in the well is measured during the pressure testing, and a seismic surface operation is performed. Seismic data is measured as part of the seismic survey operation. The pressure data and the seismic data are provided to a processing system for processing to determine characteristics of the subterranean body.

22 Claims, 6 Drawing Sheets

(56) References Cited

U.S. PATENT DOCUMENTS

| | | | |
|---|---|---|---|
| 7,274,304 B2* | 9/2007 | Hall et al. | 340/853.9 |
| 7,280,918 B2* | 10/2007 | Williams | 702/14 |
| 7,916,576 B2 | 3/2011 | Beasley et al. | |
| 7,967,069 B2 | 6/2011 | Beasley | |
| 2004/0035634 A1 | 2/2004 | Rueter | |
| 2004/0129424 A1* | 7/2004 | Hosie et al. | 166/332.8 |
| 2005/0235745 A1 | 10/2005 | Proett et al. | |
| 2006/0023567 A1 | 2/2006 | Uhl et al. | |
| 2006/0047431 A1* | 3/2006 | Geiser | 702/12 |
| 2006/0062084 A1 | 3/2006 | Drew | |
| 2006/0081412 A1* | 4/2006 | Wright et al. | 181/104 |
| 2006/0247861 A1 | 11/2006 | McCoy et al. | |
| 2007/0083331 A1* | 4/2007 | Craig | 702/13 |
| 2007/0204995 A1 | 9/2007 | Hofman et al. | |
| 2008/0149329 A1 | 6/2008 | Cooper et al. | |
| 2008/0316860 A1* | 12/2008 | Muyzert et al. | 367/25 |
| 2009/0168600 A1 | 7/2009 | Moore et al. | |
| 2009/0242205 A1 | 10/2009 | Coste et al. | |
| 2009/0248309 A1* | 10/2009 | Neville et al. | 702/8 |
| 2010/0032156 A1 | 2/2010 | Petty et al. | |
| 2010/0042325 A1 | 2/2010 | Beasley et al. | |
| 2010/0096125 A1 | 4/2010 | Beasley | |
| 2011/0199862 A1 | 8/2011 | Pop | |
| 2011/0214869 A1 | 9/2011 | Beasley | |
| 2011/0272147 A1 | 11/2011 | Beasley et al. | |
| 2013/0000893 A1 | 1/2013 | Beasley et al. | |

OTHER PUBLICATIONS

Shapiro, et al, Estimating the Crust Permeability from Fluid-Injection-Induced Seismic Emission ant the KTB Site, Geophysics Journal International, 1997, p. F15-F18, vol. 131.

Shapiro, et al, Estimating the Permeability from Fluid-Injection Induced Seismic Emission: in Thimus J.-F, Poromechanics, 1998, p. 301-305.

Shapiro, et al, Large-Scale in SITU Permeability Tensor of Rocks from Induces Microseismicity, Geophysics Journal International, 1999, p. 207-213, vol. 137.

Serge A. Shapiro, An Inversion for Fluid Transport Properties of Three-Dimensionally Heterogeneous Rocks using Induces Microseismicity, Geophysics Journal International, 2000, pp. 931-936, vol. 143.

Karpfinger, et al, Diffusivity Estimations based on Seismicity Triggered by Fluid Injections in Boreholes, Expanded Abstract Presented at the 66th EAGE Conference & Exhibition Paris, France, Jun. 7-10, 2004.

F. Cornet, Comment on "Large-Scale in Situ permeability tensor of Rocks form Induced Microseismicity" by S.A. Shapiro, P. Audigane and J. J-Royer, Geophysics Jounal Int., 2000, pp. 465-469, vol. 140.

Shapiro, et al, Reply to comment by F.H. Cornet on "Large-Scale in Situ permeability tensor of Rocks form Induced Microseismicity", Geophysics International, 2000, pp. 470-473, vol. 140.

Shapiro, et al, Characterization of Fluid Transport Properties of Reservoirs using Induced Microseismicity, Geophysics, 2002, pp. 212-220, vol. 67.

Audigane, et al, Permeability Characterization of the Soultz and Ogachi Large-Scale Reservoir using Induced Microseismicity, Geophysics, 2002, pp. 204-211, vol. 67.

Rothert, et al, Short Note: Microseismic Monitoring of Borehole Fluid Injections: Data Modeling and Inversion for Hydraulic Properties of Rocks, Geophysics, 2003, pp. 685-689, vol. 68.

Shapiro, et al, Triggering of Seismicity by Pore Pressure Perturbations: Permeability related Signatures of the Phenomenon, Pure Appl. Geophys., pp. 1051-1066, vol. 160.

R. Elmar, Fluid Induced Microseismicity: Data Modeling and Inversion for Hydraulic Properties of Rocks: PhD Thesis, Freie Universitats Berlin, http://www.diss.fu-berlin.de/diss/receive/FUDISS_thesis_000000001210, 2008.

Cooper, et al, Foinaven Active Reservoir Management : The Time-Lapse Signal, SEG 1999 Expanded Abstracsts.

Dragoset, et al, The Impact of Field Survey Characteristics on Surface-Related Multiple Attenuation, Offshore Technology Conference Proceedings 2004.

PCT Search Report, dated Mar. 16, 2010, Application No. PCT/US2009/052706.

Extended European Search Report of European Application No. 09808588.9 dated Jun. 10, 2013: pp. 1-6.

Office Action History of U.S. Appl. No. 12/256,285 from Jun. 24, 2010 to Feb. 22, 2011 (34 pages).

Office Action History of U.S. Appl. No. 13/112,780 from Sep. 2, 2011 to Feb. 24, 2012 (29 pages).

Korean Intellectual Property Office, International Search Report and Written Opinion of PCT Application Serial No. PCT/US2009/052706 dated Mar. 16, 2010 (13 pages).

The International Bureau of WIPO, International Preliminary Report on Patentability of PCT Application Serial No. PCT/US2009/052706 dated Feb. 22, 2011 (6 pages).

European Patent Office, Extended European Search Report of European Application Serial No. 09173773.4 dated Jul. 12, 2011 (6 pages).

P. B. Wills et al., "Active and passive imaging of hydraulic fractures," Geophysics: The Leading Edge of Exploration, Jul. 1992: pp. 15-22.

Biot, "Theory of propagation of elastic waves in a fluid-saturated porous solid I. Low-freqency range," Journal of the Acoustical Society of America, Mar. 1956, vol. 28, No. 2, pp. 168-178.

Wynn, "Geophysical Monitoring of Geologic Sequestration in Aquifers and Depleted Oil and Gas Fields," MS Project Report, Department of Geophysics, Stanford University, Aug. 2003, pp. 1-43.

Audigane et al., "Permeability charactization of the Soultz and Ogachi large-scale reservoir using induced microseismicity", Geophysics, vol. 67, No. 1, Jan.-Feb. 2002, pp. 2004-2211.

* cited by examiner

DETERMINING CHARACTERISTICS OF A SUBTERRANEAN BODY USING PRESSURE DATA AND SEISMIC DATA

TECHNICAL FIELD

The invention relates generally to determining characteristics of a subterranean body using pressure data and seismic data.

BACKGROUND

Well testing is commonly performed to measure data associated with a formation or reservoir surrounding a well. Well testing involves lowering a testing tool that includes one or more sensors into the well, with the one or more sensors taking one or more of the following measurements: pressure measurements, temperature measurements, fluid type measurements, flow quantity measurements, and so forth. Well testing can be useful for determining properties of a formation or reservoir that surrounds the well. For example, pressure testing can be performed, where formation/reservoir pressure responses to pressure transients are recorded and then interpreted to determine implied reservoir and flow characteristics. However, due to the one-dimensional aspect of pressure, pressure testing provides relatively limited data. Consequently, a detailed spatial description of characteristics of a formation or reservoir typically cannot be obtained using pressure testing by itself.

SUMMARY

In general, according to an embodiment, a method of determining characteristics of a subterranean body comprises performing pressure testing in a well, where the pressure testing comprises drawing down pressure in the well. Pressure data in the well is measured during the pressure testing. In addition, a seismic survey operation is performed, with seismic data received as part of the seismic surveying operation. The pressure data and seismic data are provided for processing to determine the characteristics of the subterranean body.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
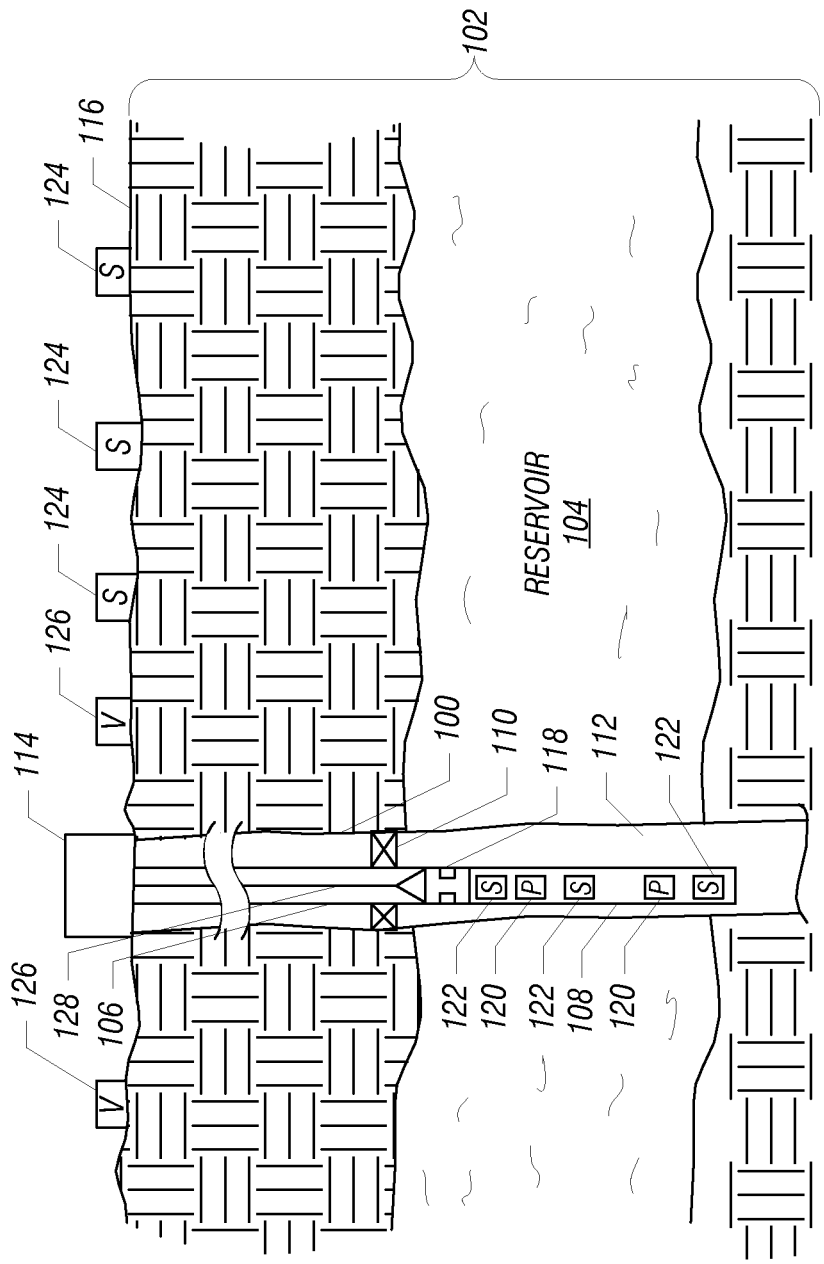
FIG. 1 illustrates an example arrangement to perform surveying of a subterranean body, according to an embodiment.

FIG. 1 illustrates an example arrangement in which a well 100 extends through a formation 102. A reservoir 104 is located in the formation 102, where the reservoir 104 can be a hydrocarbon-bearing reservoir, a water aquifer, a gas injection zone, or any other type of a subterranean body. The well 100 also extends through a portion of the reservoir 104.

In the implementation of FIG. 1, a tool string is positioned in the well 100, where the tool string includes a tubing 106 and a monitoring tool 108 attached to the tubing 106. The tubing 106 can be coiled tubing, jointed tubing, and so forth. As also depicted in FIG. 1, a packer 110 is set around the outside of the tubing 106. When set, the packer 110 isolates a well region 112 underneath the packer 110.

The tubing 106 extends to wellhead equipment 114 at an earth surface 116. Note that the earth surface 116 can be a land surface, or alternatively, can be a sea floor in a marine environment.

The tool string depicted in FIG. 1 has the ability to perform well testing (including pressure testing) in the well region 112 underneath the packer 110. In one example, ports 118 can be provided in the tool string to allow for fluid flow from the well region 112 into an inner bore of the tubing 106. This can allow for a pressure drawdown to be provided during a pressure-testing operation. Drawing down pressure refers to creating a pressure drop in the well region 112, where the pressure drop can cause the pressure in the well region 112 to fall below the reservoir 104 pressure.

The monitoring tool 108 of the tool string includes pressure sensors 120. Although multiple pressure sensors 120 are depicted, note that in an alternative implementation, just one pressure sensor can be used. The pressure sensors 120 are used to measure pressure data during the pressure testing operation.

In accordance with some embodiments, pressure data collected by the pressure sensors 120 can be stored in the tool string, such as in one or more storage devices in the tool string. Alternatively, the measurement data collected by the pressure sensors 120 can be communicated over a communications link 128 to wellhead equipment 114 or other surface equipment.

In addition to pressure sensors 120, the tool string can also include other types of sensors, such as sensors to measure temperature, fluid type, flow rate, permeability, and so forth. Such other measurement data, which can be collected during the well testing, can also be stored in storage devices of the tool string or communicated to the surface over the communications link 128.

In the example of FIG. 1, the monitoring tool 108 can also optionally include seismic sensors 122. In a different implementation, the seismic sensors 122 that are part of the tool string can be omitted. In such an implementation, seismic sensors 124 can be provided at the earth surface 116 instead. As yet another alternative, both seismic sensors 122 in the well 100 and seismic sensors 124 in the earth surface 116 can be provided. The seismic sensors 122, 124 can be any one or more of geophones, hydrophones, accelerometers, etc.

The seismic sensors 122 in the well 100 allow for performance of vertical seismic profile (VSP) surveying. Alternatively, the seismic sensors 124 at the earth surface 116 provide for surface seismic surveying. In some implementations, the measurements taken by the downhole sensors 122 can be used to calibrate the surface sensors 124 for the purpose of determining reservoir characteristics.

Seismic waves are generated by seismic sources 126, which can be deployed at the earth surface 116, or alternatively, can be deployed in the well 100. As yet another implementation, the seismic sources 126 can be towed in a body of water in a marine seismic surveying context. Examples of seismic sources include air guns, vibrators, explosives, or other sources that generate seismic waves. The seismic waves generated by a seismic source travel through a formation, with a portion of the seismic waves reflected back by structures within the formation, such as the reservoir 104. The reflected seismic waves are received by seismic sensors. Reflected seismic signals detected by the seismic sensors are stored as seismic measurement data.

In the implementation where seismic sensors 122 are provided as part of the monitoring tool 108, seismic data can be stored in storage devices of the tool string or communicated over the communications link 128 to the surface.

The collected seismic data and pressure data can be processed by a processing system (e.g., a computer). Processing of the pressure data and seismic data can include any one or more of the following: interpreting the pressure data and seismic data together to determine characteristics of the reservoir 104; inverting the pressure data and seismic data to identify characteristics of the reservoir 104; and so forth.

Figures 2, 3:
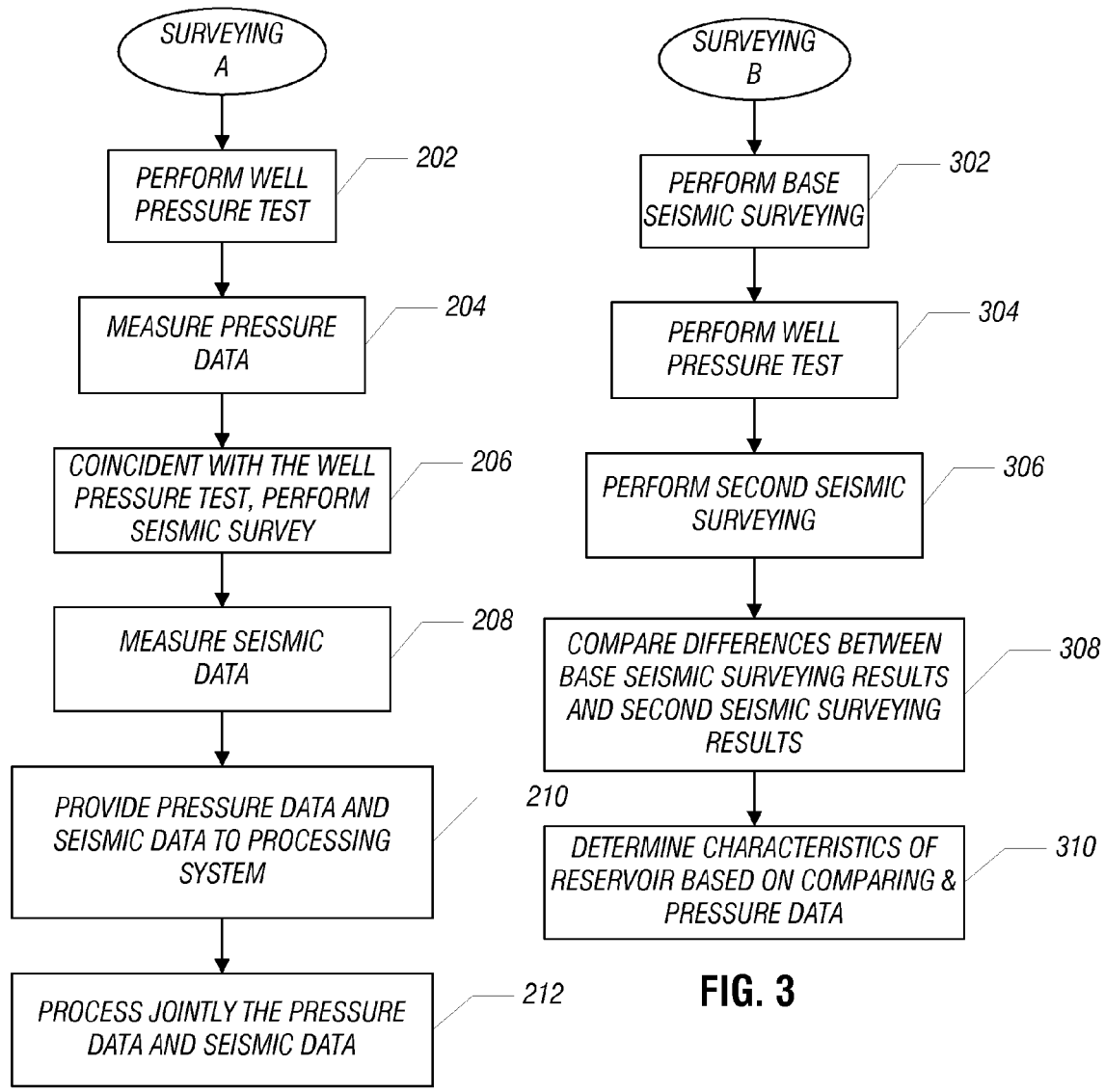
FIGS. 2 and 3 are flow diagrams of processes of performing surveying using seismic data and pressure data, according to some embodiments.

FIG. 2 is a flow diagram of a surveying operation for determining characteristics of a reservoir (or other subterranean body in accordance with a first embodiment. A well pressure test is performed (at 202), where the well pressure test involves drawing down pressure in a well region (e.g., well region 112 in FIG. 1). The well pressure test that includes drawing down the pressure in the well region 112 causes a pressure drop between the reservoir 104 and the well region 112. As part of the well pressure test, the well is shut in (in other words, sealed at the earth surface or at some other location in the well) such that no further fluid communication occurs between the well 100 and the earth surface location. After shut in, the pressure in the well region 112 builds up gradually as a result of fluid flow from the reservoir 104 into the well region 112. During this time, the pressure sensors 120 can make (at 204) measurements at different time points to obtain a record of the pressure change behavior during the well pressure test. In addition to pressure data, other sensors can make measurements of other parameters (e.g., temperature, fluid type, flow rate, permeability, etc.).

Based on the pressure data obtained as part of the well pressure test, it can be determined how far from the well 100 the reservoir extends. In other words, a characteristic of the reservoir 104 that can be determined using the well pressure test is a radial extent of the reservoir from the well.

However, as noted above, determining characteristics of a reservoir based on just well pressure testing does not produce comprehensive information. In accordance with some embodiments, seismic surveying is also performed (at 206) coincident with the well pressure test. Performing seismic surveying "coincident" with the well pressure test refers to either simultaneously performing the well pressure test and seismic survey together at about the same time, or alternatively performing the seismic surveying a short time after the well pressure test. Changes in reservoir pressure have an effect on the rock matrix and fluids in the reservoir. Seismic data is sensitive to such pressure changes.

As part of the seismic surveying operation, seismic data is measured (at 208) by seismic sensors (e.g., seismic sensors 122 in the well 100 or seismic sensors 124 on the surface 116). Performing the seismic surveying involves activating seismic sources 126 to produce seismic waves that are reflected from the reservoir 104. The reflected seismic waves are detected by the seismic sensors 122 and/or 124.

Next, the pressure data and seismic data are provided (at 210) to a processing system for subsequent processing. The pressure data and seismic data are then processed (at 212) jointly by the processing system. Processing the pressure data and seismic data jointly (or together) refers to determining characteristics of the reservoir 104 based on both the pressure data and seismic data.

Based on the pressure data and seismic data, various characteristics of the reservoir 104 can be ascertained, including the presence of any flow barriers inside the reservoir 104. Note that additional information that can be considered by the processing system in determining characteristics of the reservoir 104 includes information relating to temperature, fluid types (types of fluid in the reservoir), flow rates (rate of flow of fluids), permeability, and other information.

As a result of the seismic surveying, pressure differentials across flow barriers of the reservoir can be determined. Using p-wave velocity and/or s-wave velocity information, a pressure profile can be determined. This pressure profile can be used to identify the differential pressures in the reservoir 104 such that spatial locations of flow barriers can be identified.

Seismic surveying can refer to any type of seismic surveying, such as marine, land, multi-component, passive seismic, earth body wave seismic, and so forth.

FIG. 3 shows a flow diagram of a surveying operation according to another embodiment. Here, a base seismic surveying is performed (at 302) prior to performing well pressure testing. As a result of the base seismic surveying, base seismic data is recorded (this is the baseline measurement data).

Then, a well pressure test is performed (at 304), similar to the well pressure test at 202 in FIG. 2. As a result of the well pressure test, pressure data is measured. Coincident with the well pressure test, a second seismic surveying operation is performed (at 306). Seismic data resulting from the second seismic survey operation is recorded (this is the monitor measurement data).

Note that the second seismic surveying operation is affected by the well pressure test that involves a drawdown of pressure in the well. In contrast, the seismic data recorded from the base seismic surveying operation is not affected by the pressure drawdown performed in the well pressure testing. Therefore, the seismic data of the second seismic surveying operation would be different from the seismic data of the base seismic surveying operation.

The seismic data (of both the base and second seismic surveying operations) and pressure data are provided to a processing system, which compares (at 308) the differences between the base seismic surveying seismic data and second seismic surveying seismic data. The differences in amplitudes of p-waves, for example, can be related to pressure changes that identify locations of flow barriers. Based on the comparison results, and the pressure data, characteristics of the reservoir can be determined (at 310).

Alternatively, additional monitor seismic survey operations can be performed over time after the base seismic survey operation. The differential changes between respective seismic data of the monitor seismic survey operations can be used to determine pressure changes, which can then be used to determine reservoir characteristics.

Figure 4:
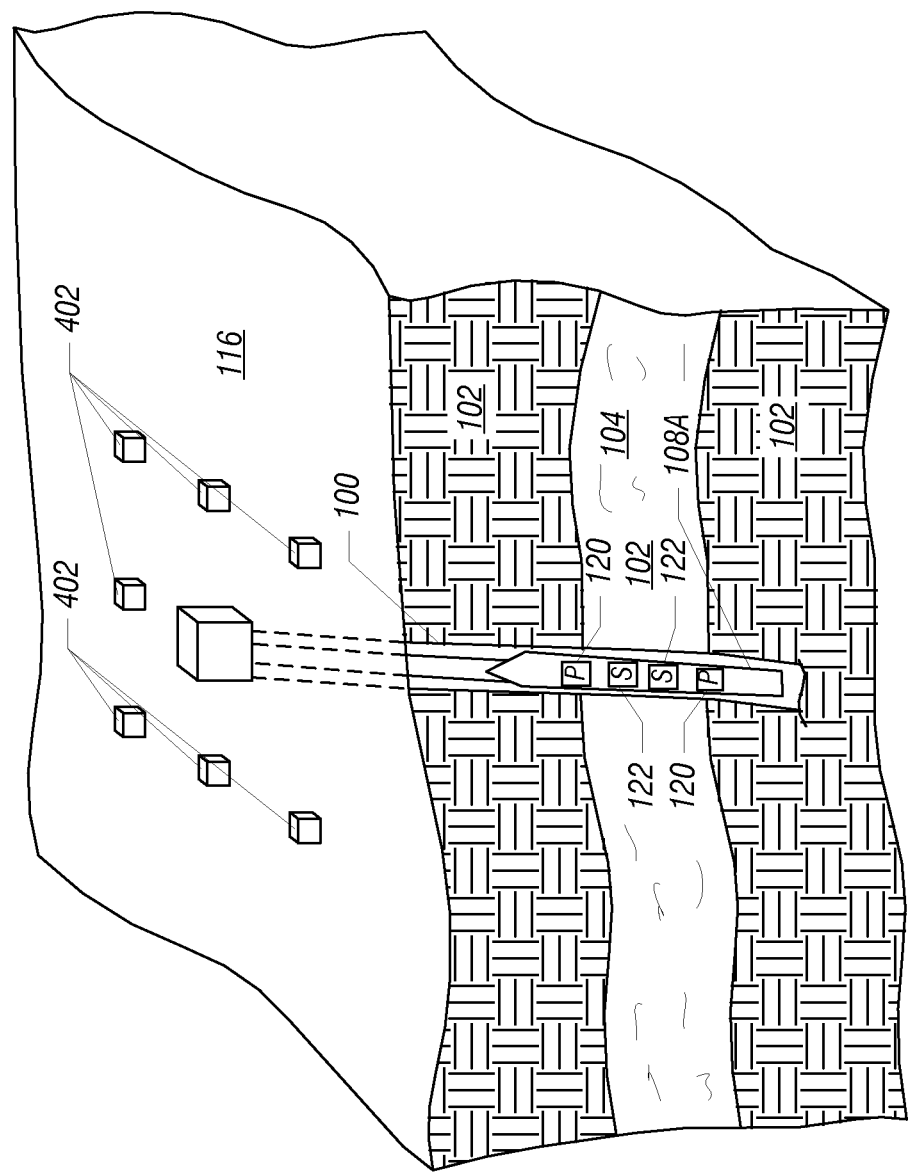
FIG. 4 illustrates an arrangement in which tilt meters are also provided to collect tilt information on a surface to further enable characterization of a subterranean body, according to an embodiment.

FIG. 4 shows another survey arrangement in which pressure data collected by pressure sensors 120 and seismic data collected by seismic sensors 122 that are part of a monitoring tool 108A can be used in conjunction with data collected by tilt meters 402 deployed on earth surface 116 above the formation 102. Although not shown, seismic sensors on the earth surface 116 can additionally or alternatively be provided. Tilt meters 402 are used to measure tilt of portions of the surface 116 on which the corresponding tilt meters 402 are deployed. As fluid is drawn out of the reservoir 104, there may be slight depressions in the surface 116. The tilt meters 402 are used to measure tilt caused by such slight depressions. The tilt meters 402 are deployed over an area corresponding to the expected aerial extent of the reservoir 104 (or some section of the reservoir 104).

To characterize the reservoir 104, a well pressure test is performed by drawing down pressure in a well region in the well 100. The tilt meters then measure information as a function of time for detecting any slight depressions in the surface 116. The measured tilt meter data determines the propagation of pressure waves over time. Also, seismic surveying can also be performed to collect seismic data, according to either the FIG. 2 or 3 procedure above. The pressure data is then combined with the tilt meter data and seismic data to determine characteristics of the reservoir. The tilt meter data can be used to obtain a spatial map of the reservoir deformation to provide additional information for determining characteristics of the reservoir.

In the discussion above, reference is made to measuring data in just one well. Alternatively, multiple wells can be provided, in which pressure sensors can be provided in the multiple wells. The pressure data from the multiple wells can be used with other data (e.g., seismic data and/or tilt meter data) to determine characteristics of the reservoir.

Figure 5:
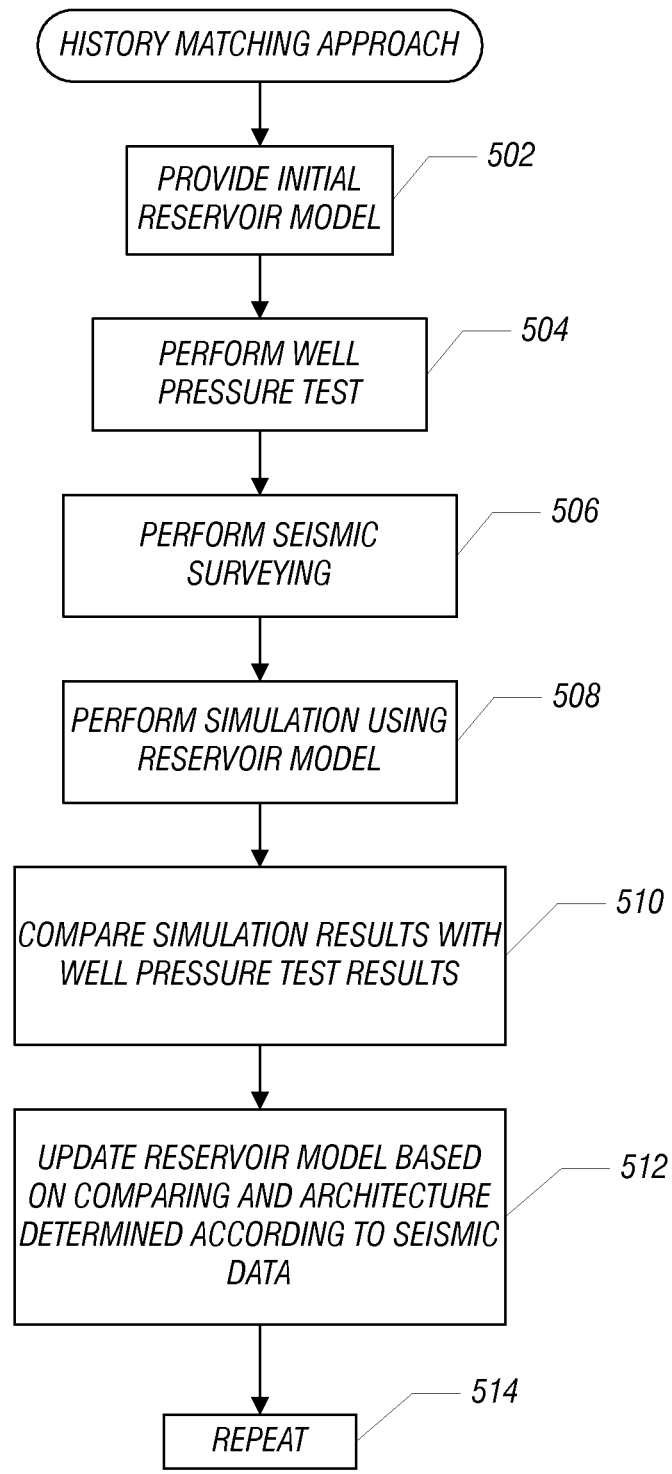
FIG. 5 is a flow diagram of a process of using a history matching approach to characterize a subterranean body, according to another embodiment.

The above passages describe various interpretive techniques of characterizing a subterranean body. In another embodiment, a history-matching approach can be used, as depicted in FIG. 5. In this approach, an initial reservoir model is initially provided (at 502). This initial reservoir model can be a homogeneous, three-dimensional (3D) model of a subterranean model, which assumes that the reservoir is homogeneous. Note that such assumption is generally not true, and thus the initial model may not be completely accurate.

Next, a well pressure test is performed (at 504), with pressure data collected as a result of the well pressure test. Next, seismic surveying can be performed (at 506).

A simulation is then performed (at 508) using the reservoir model, which at this point is the initial reservoir model. The simulation models the pressure drawdown as a function of time. The simulation results are compared (at 510) with the well pressure results to determine the level of matching. Initially, it is unlikely that the simulation results will match with the well pressure test results. Consequently, the reservoir model is updated (at 512) based on the comparing and also based on architecture or structural information of the reservoir that is determined according to the seismic data. The seismic data allows a well operator to determine the structure or architecture of the reservoir. This determined structure or architecture, in conjunction with the comparison of the simulated pressure data and actual pressure data, can then be used to update the reservoir model such that a more accurate reservoir model is provided. The process at 504-512 is then repeated (at 514) using the updated reservoir model. The tasks are iteratively performed to incrementally update the reservoir model until the comparing performed at 510 indicates a match between the simulated pressure data and the actual pressure data within some predefined threshold.

Note that instead of using seismic data based on performing seismic surveying (at 506), tilt meter information can be collected instead for determining the structure or architecture of the reservoir. Alternatively, both seismic data and tilt meter data can be used.

Figure 6:
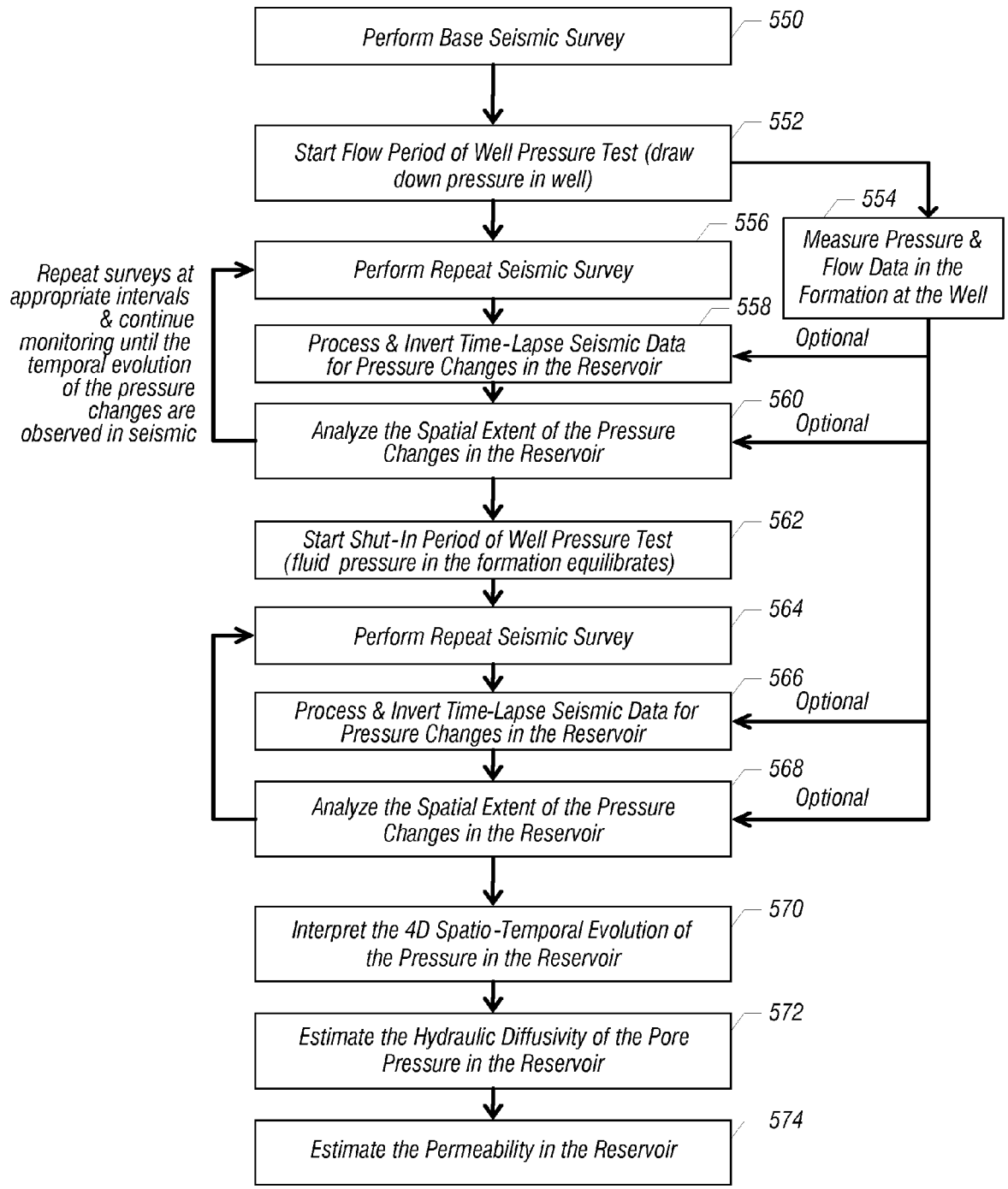
FIG. 6 is a flow diagram of a process of performing surveying using seismic data and pressure data, according to yet another embodiment.

FIG. 6 shows yet another embodiment of a surveying operation that uses both seismic and pressure data. Initially, a base seismic survey is performed (at 550), prior to performing well pressure testing. This provides the baseline seismic data.

Next, a well pressure test is started (at 552), in which fluid flow is created by drawing down pressure in the well. Pressure and fluid flow data associated with the formation and well are measured (at 554).

A seismic survey is then repeated (at 556) to collect seismic data after the pressure drawdown. The point here is to keep repeating the seismic surveys at periodic intervals and continue monitoring until the temporal evolution of the pressure changes are observed in the seismic data.

The time-lapse seismic data (seismic data collected at different times in different surveys) are processed and inverted (at 558) to detect pressure changes in the reservoir. Also, the spatial extent of the pressure changes in the reservoir can be analyzed (at 560). Note that the "optional" label to boxes 558 and 560 means that the measured pressure data (which is continually occurring) can be provided as optional inputs to perform the tasks of boxes 558 and 560.

If additional data is desired, the well can be shut in (at 562). As a result of shut-in, the fluid pressure in the formation equilibrates. Another seismic survey is performed (at 564) after shut in. Again, the time-lapse seismic data can be processed and inverted (at 566) to detect pressure changes in the reservoir. Also, the spatial extent of the pressure changes in the reservoir can be analyzed (at 568).

Note that tasks 562-568 are optional and can be omitted if the additional data is not desired by the survey operator.

The four-dimensional (4D) spatio-temporal evolution of the pressure in the reservoir can then be determined (at 570). What this means is that movement of pressure fronts as a function of both time and space can be captured.

The hydraulic diffusivity of the pore pressure in the reservoir can be estimated (at 572). Also, determining the 4D spatio-temporal evolution of the pressure in the reservoir allows changes in the elastic properties of the formation rock to be monitored during well tests so as to estimate permeability (at 574) from the spatio-temporal analysis of the pressure-induced elastic changes.

Figure 7:
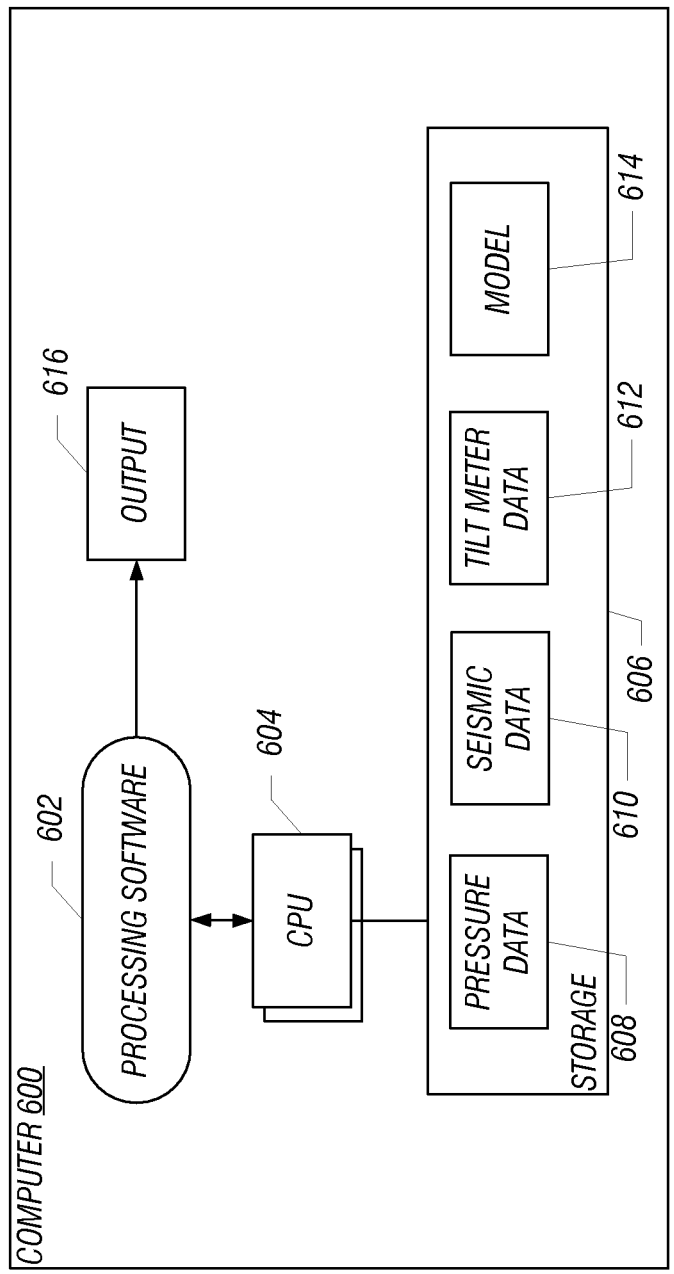
FIG. 7 is a block diagram of a computer, including processing software for processing seismic data and pressure data, according to an embodiment.

FIG. 7 shows an example computer 600 that can be used to perform various processing tasks discussed above. The computer 600 includes processing software 602 that is executable on one or more central processing units (CPUs) 604. The processing software 602 can perform the task 212 of FIG. 2, the tasks 308 and 310 of FIG. 3, and the tasks 508, 510, and 512 of FIG. 5.

The CPU(s) 604 is (are) connected to a storage 606, which can contain various data, including one or more of pressure data 608, seismic data 610, tilt meter data 612, and a reservoir model 614.

The processing software 602 is able to provide an output 616 based on the processing performed by the processing software 602. The output 616 can be in the form of a graphical output for presentation in a display, or can be some type of a report communicated over a network to a remote device terminal.

Instructions of the processing software 602 are loaded for execution on a processor (such as one or more CPUs 604). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of determining characteristics of a subterranean body, comprising:
    performing a simulation using a reservoir model of the subterranean body through which a well extends to obtain simulated pressure data;
    performing pressure testing in the well, wherein the pressure testing comprises drawing down pressure in the well;
    measuring pressure data in the well during the pressure testing;
    comparing the simulated pressure data with the measured pressure data;
    performing a seismic survey operation that includes activation of at least one seismic source outside the well;
    measuring seismic data as part of the seismic survey operation; and
    updating, by a processing system, the reservoir model of the subterranean body according to the comparing and according to an architecture of the subterranean body determined based on the seismic data, wherein the reservoir model is representative of the characteristics of the subterranean body.

2. The method of claim 1, further comprising:
    measuring tilts using tilt meters provided at a surface above the subterranean body; and
    using the measured tilts along with the seismic data to determine the architecture of the subterranean body.

3. The method of claim 1, wherein performing the seismic survey operation is performed coincidentally with the pressure testing, wherein the seismic data is affected by pressure changes in the subterranean body due to the pressure testing, the at least one seismic source activated in the seismic survey operation being located at or above an earth surface above the subterranean body.

4. The method of claim 1, wherein performing the seismic survey operation comprises performing a first seismic survey operation coincidentally with the pressure testing, the method further comprising:
    performing a base seismic survey operation prior to the pressure testing; and
    comparing seismic data of the base seismic survey operation with the seismic data of the first seismic survey operation.

5. The method of claim 4, wherein determining the architecture of the subterranean body is based on the comparing of the seismic data of the base seismic survey operation and the seismic data of the first seismic survey operation.

6. The method of claim 1, wherein performing the seismic survey operation comprises performing a first seismic survey operation, the method further comprising:
    performing a base seismic survey operation prior to the pressure testing; and
    comparing seismic data of the base seismic survey operation with the seismic data of the first seismic survey operation.

7. The method of claim 6, further comprising:
    performing a second seismic survey operation after the first seismic survey operation;
    comparing seismic data of the respective first and second seismic survey operations; and
    wherein determining the architecture of the subterranean body is based on the comparing of the seismic data of the base seismic survey operation with the seismic data of the first seismic survey operation, and based on the comparing of the seismic data of the respective first and second seismic survey operations.

8. The method of claim 1, further comprising iteratively performing the simulation and updating tasks to incrementally refine the reservoir model of the subterranean body.

9. The method of claim 1, wherein measuring the seismic data comprises measuring the seismic data using seismic sensors provided at an earth surface above the subterranean body, and wherein the at least one seismic source is selected from the group consisting of an air gun, a vibrator, and an explosive.

10. The method of claim 1, wherein performing the simulation using the reservoir model of the subterranean body comprises performing the simulation using the reservoir model of a reservoir through which the well extends.

11. A method of determining characteristics of a subterranean body, comprising:
    performing pressure testing in a well, wherein the pressure testing comprises drawing down pressure in the well;
    measuring pressure data in the well during the pressure testing;
    performing a first seismic survey operation coincidentally with the pressure testing;
    measuring seismic data as part of the seismic survey operation; and
    providing the pressure data and seismic data to a processing system for processing to determine the characteristics of the subterranean body;
    performing a base seismic survey operation prior to the pressure testing to obtain baseline seismic data, wherein the seismic data obtained from the seismic survey operations make up time-lapse seismic data;
    processing the time-lapse seismic data to detect pressure changes;
    shutting in the well;
    during the shut in of the well, performing another seismic survey operation to obtain further seismic data; and
    processing further time-lapse data that includes the further seismic data and previously acquired seismic data.

12. An article comprising at least one non-transitory computer-readable storage medium containing instructions that when executed cause a computer to:
    perform a simulation using a reservoir model of the subterranean body through which a well extends to obtain simulated pressure data;
    receive pressure data measured during a well pressure test, where the well pressure test involves drawing down pressure in the well;
    compare the simulated pressure data with the received pressure data;
    receive seismic data measured as part of a seismic survey operation that includes activation of at least one seismic source outside the well; and update the reservoir model of the subterranean body according to the comparing and according to structural information of the subterranean body determined based on the seismic data, wherein the reservoir model is representative of characteristics of the subterranean body.

13. The article of claim 12, wherein the instructions when executed cause the computer to further:
receive data measured by tilt meters provided on an earth surface above the subterranean body,
wherein the structural information of the subterranean body is further based on the data measured by the tilt meters.

14. The article of claim 12, wherein receiving the seismic data measured as part of the seismic survey operation comprises receiving the seismic data measured as part of a first seismic survey operation performed coincidentally with the well pressure test, wherein the seismic data measured as part of the first seismic survey operation is affected by pressure changes in the subterranean body caused by the well pressure test, wherein the instructions when executed cause the computer to further:
receive seismic data measured as part of a base seismic survey operation performed prior to the well pressure test; and
compare the seismic data of the base seismic survey operation and the seismic data of the first seismic survey operation,
wherein the structural information of the subterranean body is determined according to the comparing.

15. The article of claim 12, wherein the instructions when executed cause the computer to further:
iteratively perform the simulation and updating tasks to incrementally refine the reservoir model of the subterranean body.

16. The article of claim 12, wherein the at least one seismic source is selected from the group consisting of an air gun, a vibrator, and an explosive.

17. The article of claim 12, wherein the subterranean body includes a reservoir of fluids that are to flow into the well, and wherein the reservoir model includes a model of the reservoir.

18. A computer comprising:
at least one processor; and
processing software executable on the at least one processor to:
perform a simulation using a reservoir model of a subterranean body through which a well extends to obtain simulated pressure data;
receive pressure data measured during a well pressure test, where the well pressure test involves drawing down pressure in the well;
compare the simulated pressure data with the received pressure data;
receive seismic data measured as part of a seismic survey operation that includes activation of at least one seismic source outside the well; and
update the reservoir model of the subterranean body according to the comparing and according to structural information of the subterranean body determined based on the seismic data, wherein the reservoir model is representative of characteristics of the subterranean body.

19. The computer of claim 18, wherein the pressure data is measured using pressure sensors of a tool string that performs the well pressure test, and wherein the seismic data is measured using seismic sensors provided on at least one of the tool string and on an earth surface above the subterranean body.

20. The computer of claim 18, wherein the processing software is executable on the at least one processor to further:
receive data collected by tilt meters provided on an earth surface above the subterranean body, wherein the structural information of the subterranean body is further based on the data collected by the tilt meters.

21. The computer of claim 18, wherein the subterranean body includes a reservoir of fluids that are to flow into the well, and wherein the reservoir model includes a model of the reservoir.

22. The computer of claim 18, wherein the at least one seismic source is selected from the group consisting of an air gun, a vibrator, and an explosive.

* * * * *